US007664078B2

(12) United States Patent
Boyd et al.

(10) Patent No.: US 7,664,078 B2
(45) Date of Patent: *Feb. 16, 2010

(54) METHOD AND APPARATUS FOR EFFICIENT SHARING OF COMMUNICATION SYSTEM RESOURCES

(75) Inventors: Kevin M. Boyd, Issaquah, WA (US); Salvador Garcia, Jr., Redmond, WA (US); Eamonn Gormley, Seattle, WA (US); Anh Nguyen, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 74 days.

This patent is subject to a terminal disclaimer.

(21) Appl. No.: 11/745,564

(22) Filed: May 8, 2007

(65) Prior Publication Data
US 2007/0206541 A1 Sep. 6, 2007

Related U.S. Application Data

(63) Continuation of application No. 10/922,109, filed on Aug. 19, 2004, now Pat. No. 7,251,250, which is a continuation of application No. 09/723,421, filed on Nov. 28, 2000, now abandoned.

(60) Provisional application No. 60/181,014, filed on Feb. 8, 2000.

(51) Int. Cl.
*H04J 3/00* (2006.01)

(52) U.S. Cl. ............... 370/336; 455/434; 455/450; 455/452.1; 455/453; 455/426.2

(58) Field of Classification Search ............... 455/434, 455/450, 452.1, 453, 426.2; 370/336
See application file for complete search history.

(56) References Cited

U.S. PATENT DOCUMENTS

| 4,482,999 A | 11/1984 | Janson et al. |
| 4,821,089 A * | 4/1989 | Strauss ............... 257/328 |
| 5,434,847 A | 7/1995 | Kou |
| 5,572,546 A | 11/1996 | Serfaty et al. |
| 5,574,728 A | 11/1996 | Mamaghani et al. |
| 5,636,223 A | 6/1997 | Reardon et al. |

(Continued)

OTHER PUBLICATIONS

Kin K. Leung et al., "A New Digital Sense Multiple Access (DSMA) Protocol for High-Speed Wireless Networks," Ninth IEEE International Symposium on Personal, Indoor and Mobile Radio Communications, vol. 3, 1998, IEEE, pp. 1360-1366.

*Primary Examiner*—Joseph H Feild
*Assistant Examiner*—Huy D Nguyen
(74) *Attorney, Agent, or Firm*—Zagorin O'Brien Graham LLP

(57) ABSTRACT

A method for accessing a reverse channel for communication from a remote unit to a base station is disclosed. The method includes waiting a random period of time in response to determining that the reverse channel is available at a first time. The method also includes monitoring a forward channel after expiration of the random period of time to determine whether the reverse channel is available at a second time. The method further includes transmitting a first portion of data on the reverse channel in response to determining that the reverse channel is available at the second time.

14 Claims, 6 Drawing Sheets

U.S. PATENT DOCUMENTS

| | | |
|---|---|---|
| 5,719,872 A | 2/1998 | Dubberly et al. |
| 5,729,542 A | 3/1998 | Dupont |
| 5,734,867 A * | 3/1998 | Clanton et al. ............. 455/12.1 |
| 5,774,459 A | 6/1998 | Charrat |
| 5,790,551 A | 8/1998 | Chan |
| 5,796,726 A * | 8/1998 | Hassan et al. ............... 455/450 |
| 5,973,613 A | 10/1999 | Reis et al. |
| 6,157,621 A * | 12/2000 | Brown et al. ................ 370/310 |
| 6,188,910 B1 | 2/2001 | Park et al. |
| 6,608,821 B1 | 8/2003 | Gendel |
| 6,614,757 B1 | 9/2003 | Rochberger et al. |
| 6,643,318 B1 | 11/2003 | Parsa et al. |
| 6,724,777 B1 | 4/2004 | Yamazaki et al. |
| 6,747,995 B1 | 6/2004 | Brown et al. |
| 6,963,580 B2 | 11/2005 | Chien et al. |
| 7,251,250 B2 * | 7/2007 | Boyd et al. ............... 455/426.2 |

\* cited by examiner

METHOD AND APPARATUS FOR EFFICIENT SHARING OF COMMUNICATION SYSTEM RESOURCES

CROSS REFERENCE TO RELATED APPLICATIONS

This application is a continuation of U.S. patent application Ser. No. 10/922,109 filed Aug. 19, 2004 now U.S. Pat. No. 7,251,250, which is a continuation of U.S. application Ser. No. 09/723,421 filed Nov. 28, 2000 now abandoned, which claims the benefit of U.S. Provisional Application No. 60/181,014 filed Feb. 8, 2000, all of which are incorporated herein by reference in their entirety.

BACKGROUND

1. Field of the Invention

The invention relates generally to a system having a channel that is accessed by a plurality of remote units. More specifically, the invention relates to a method of accessing the plurality of remote units.

2. Background of the Invention

Wireless local loop technology is becoming an increasingly popular means for providing communication services such as telephony, data services and television programming. A fixed wireless loop network includes a plurality of base stations. Each base station is in wireless communication with a plurality of remote units which are typically located at the premises of an end user where they are connected to the premises equipment such as telephones, computers and faxes. The premises equipment receives communication services over a wireless link between the base station and the remote unit.

Two or more of the remote units typically transmit data to a base station on a reverse channel. When more than one remote unit has data to transmit to the base station, they may try to concurrently access the reverse channel. When more than one remote unit transmits on the reverse channel, a collision results. A collision prevents data from any of the remote units from being successfully decoded at the base station, thus reducing the efficiency of fixed wireless loop telecommunication systems. As a result, there is a need for controlling access to a reverse channel so as to reduce the number of collisions.

SUMMARY OF THE INVENTION

The invention relates to a method for accessing a reverse channel for communication from a remote unit to a base station. The method includes waiting a random period of time in response to determining that the reverse channel is available at a first time. The method also includes monitoring a forward channel after expiration of the random period of time to determine whether the reverse channel is available at a second time. The method further includes transmitting a first portion of data on the reverse channel in response to determining that the reverse channel is available at the second time.

The method can also include transmitting from the remote unit to the base station a second portion of the data on the reverse channel in response to determining that transmitting the first portion of data caused the remote unit to access the reverse channel.

Determining whether the remote unit has accessed the reverse channel can include determining whether the reverse channel stayed available from when the first portion of data was transmitted until a round-trip time had passed. The round-trip time is the time required for a transmission on the reverse channel to be evident on a forward channel.

Determining whether the remote unit has accessed the reverse channel can include determining whether the reverse channel is available at a round-trip time after transmitting the first portion of data. The round-trip time is the time required for a transmission on the reverse channel to be evident on the forward channel.

Determining whether the remote unit has accessed the reverse channel can include determining whether the base station successfully decoded the first portion of data.

The invention also relates to a method for accessing a reverse channel for providing communication from a remote unit to a base station. The method includes executing a channel access method to access the reverse channel and waiting a second random time in response to the channel access method failing to provide access to the reverse channel. The method also includes re-executing the channel access method in response to a determination that the reverse channel is not available after passage of the second random time.

DETAILED DESCRIPTION

The invention relates to a communication system having a reverse channel which is accessed by a plurality of remote units. When a remote unit has data to be transmitted on the reverse channel, the remote unit executes a channel access method to gain access to the reverse channel. The channel access method includes waiting until the reverse channel is available. When the reverse channel becomes available, the remote unit waits a first random period of time. After the first random period of time has expired, the remote unit determines whether the reverse channel is available. If the reverse channel is available, the remote unit transmits a first portion of the data on the reverse channel.

Waiting a first random period of time before transmitting on the reverse channel reduces the likelihood of collision when multiple remote units are trying to access the channel. If the remote units were to transmit as soon as the channel became available, a collision would result each time more than one remote unit was waiting for the channel to become available. Because the remote units wait a first random period of time before transmitting, the odds of more than one remote unit transmitting at the same time are reduced.

When the method for accessing a channel does not result in the remote unit gaining access to the channel, the remote unit executes an access failure method. The access failure method includes waiting a second random time. If the channel is still unavailable after the second random time, the remote unit re-executes the channel access method.

Figure 1:
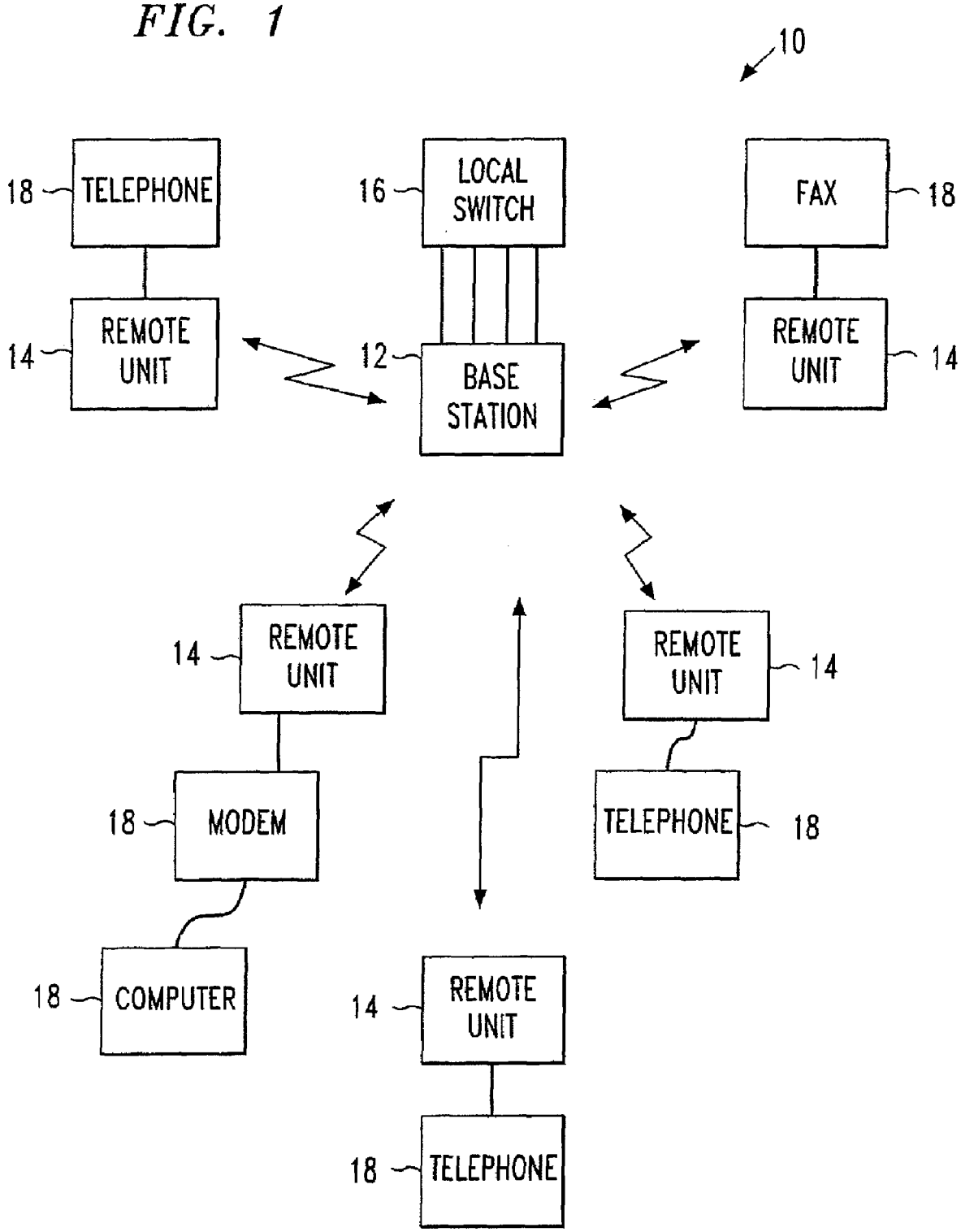
FIG. 1 illustrates a communication system including a base station in wireless communication with a plurality of remote units.

FIG. 1 illustrates an example of a communication system 10 employing one or more base stations 12 and a plurality of remote units 14. The particular system illustrated is a fixed wireless loop network although the invention can be used in conjunction with other systems. A base station 12 is in communication with a local switch 16 which can include, for example, a No. 5 ESS provided by Lucent Technologies. A suitable local switch 16 includes, but is not limited to, a voice switch and a data switch. The base station 12 is also in wireless communication with a plurality of remote units 14 located within the service area of the base station 12.

The base station 12 includes a transmitter and a receiver which act as an air link interface to the remote units 14. The base station 12 also includes certain processing and memory capabilities which provide the remote units 14 with the functionality described in this application.

When the system is a fixed wireless loop network, the remote units 14 can be geographically fixed. For instance, the remote units 14 can be fixed to a premises such as a home or a business. The remote unit 14 can be in communication with a variety of premises communication equipment 18 including, but not limited to, telephones, computers, modems and fax machines.

The remote units 14 also include a transmitter and a receiver which act as an air link interface to the base station 12. The remote units 14 also include processing and memory capabilities that provide the remote units 14 with the functionality described in this application.

Figure 2:
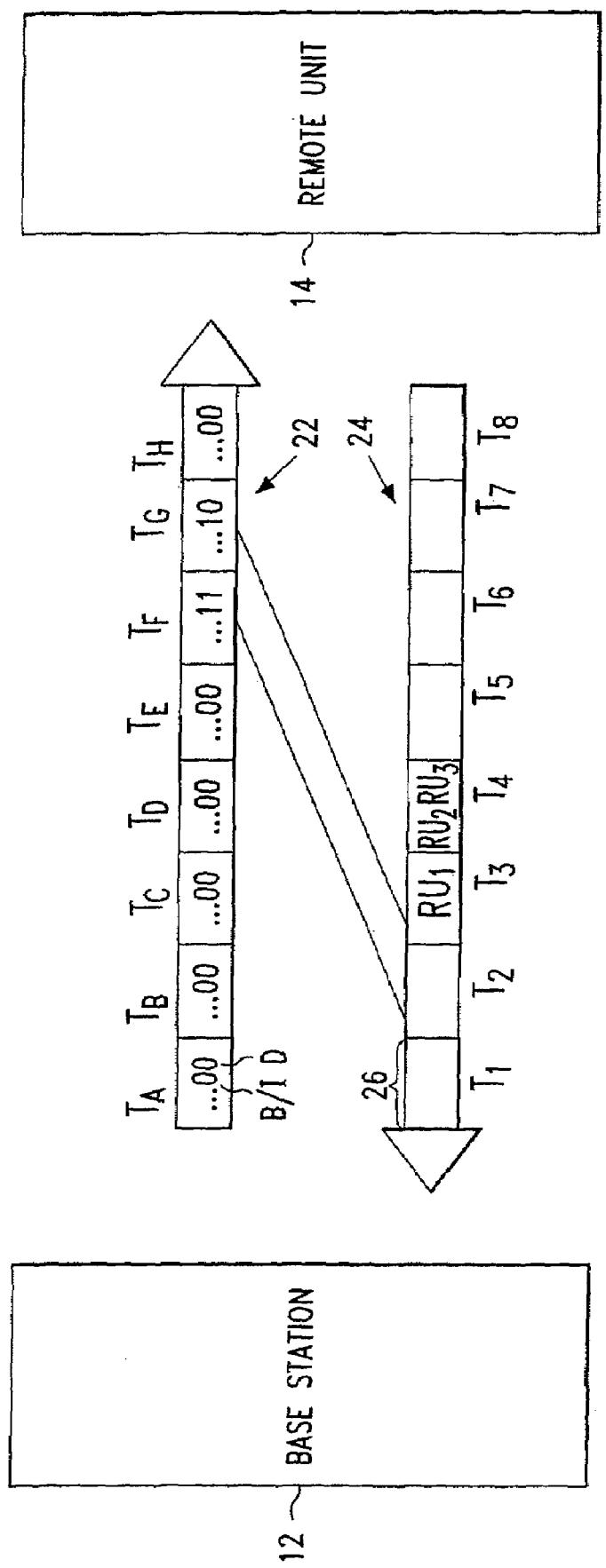
FIG. 2 illustrates communication between a base station and a remote unit on a forward channel and a reverse channel.

FIG. 2 illustrates communication between a base station 12 and a remote unit 14. The base station communicates with the remote unit over a forward channel 22 and the remote unit communicates with the base station over a reverse channel 24. The communications of the base station on the forward channel 22 can be received and processed by each of the remote units in the system. Each of the remote units communicate with the base station on the same reverse channel.

The reverse 24 and forward 22 channels are each divided into a plurality of timeslots 26. The reverse channel is illustrated as being divided into eight timeslots 26, $T_1$-$T_8$. The subscripts 1-8 indicate the chronological order of the time slots. The forward channel 22 is illustrated as being divided into eight timeslots 26, $T_A$-$T_H$. The subscripts A-H indicate the chronological order of the time slots. For illustrative purposes, the timeslots 26 on the forward channel 22 are illustrated as occurring in a direction which is opposite to the direction of transmission. Accordingly, timeslot $T_A$ is on the forward channel 22 at substantially the same time as $T_1$ is on the reverse channel 24.

The time slots on the forward channel 22 contain at least two bits of information. The bit labeled the B/I (busy/idle) bit provides information as to whether the base station is capable of receiving data in a time slot along the reverse channel. Accordingly, this bit indicates whether the reverse channel is available for use by one of the remote units. For instance, the base station sets the B/I bit to zero when the reverse channel is available and sets the B/I bit to one when the reverse channel is unavailable.

The D bit indicates whether the base station has successfully decoded data received in a time slot. A failure to decode received data can result from a collision of two or more remote units transmitting data into the same time slot or from other transmission errors. For the purposes of this application, the base station sets the D bit to zero when the base station has not successfully decoded data received from a remote unit and sets the D bit to one when the base station has successfully decoded data received from a remote unit.

The remote units monitor the B/I bits on the forward channel 22 to determine when to transmit to the base station. When the remote units have data to be transmitted to the base station, the remote units wait until the B/I bit indicates that the reverse channel 24 is available. Once the B/I bit indicates that the reverse channel 24 is available, the remote units with data to be transmitted wait a random period of time after the reverse channel 24 becomes available. After passage of the random period of time, each remote unit determines whether the reverse channel 24 is still available. When the reverse channel 24 is still available, the remote units transmit at least a first portion of the data to be transmitted. Because each remote unit determines the random period of time which it will wait, each remote unit can wait a different period of time before testing whether the reverse channel 24 is still available. When each remote unit waits a different period of time, the opportunity for a collision resulting from concurrent transmission of data is reduced as compared to systems which do not wait a random period of time before transmitting.

The time between a remote unit's transmission of a data package in a time slot on the reverse channel 24 and receipt of a response to that transmission from the base station is referred to as round-trip time. From system to system the "round-trip" time interval may vary depending on the hardware and software implementations. Within a given system, however, this round-trip time interval can be fixed and is known to the base station and the associated remote units.

An example of the round-trip time is illustrated in FIG. 2. Since the B/I bit in timeslot $T_C$ indicates that the reverse channel 24 is available, Remote unit 1 ($RU_1$) transmits data on the reverse channel 24 at timeslot $T_3$. The B/I and D bits in the time slots on the forward channel 22 remain as zero for two time slots ($T_D$ and $T_E$) beyond the time slot in which $RU_1$ transmits data, $T_3$. The transmission on the reverse channel 24 becomes evident on the forward channel 22 at timeslot $T_F$ because the B/I bit and the D bit have been changed from zero to one. Since three timeslots 26 pass between the transmission of the data on the reverse channel 24 and the transmission becoming evident on the forward channel 22, the round-trip time is three timeslots 26.

The timeslot where a remote unit transmits on the reverse channel 24 is called the transmission timeslot. The timeslot on the forward channel 22 at the round-trip time after the transmission timeslot is called the round-trip timeslot. Each transmission timeslot is associated with a round-trip timeslot in that the round-trip timeslot is consulted for data about the data transmitted in the associated transmission timeslot.

A remote unit consults the associated round-trip timeslot to determine whether data transmitted in a particular transmission timeslot has been decoded successfully by the base. For instance, when D bit is set to one, the data was successfully decoded. When the D bit is set to zero, the data was not decoded. In view of these conditions, when the first remote unit $RU_1$ of FIG. 2 transmits data at timeslot $T_3$ and then consults timeslot $T_F$, the D bit indicates that the data was successfully decoded. However, when a second remote unit $RU_2$ and a third remote unit $RU_3$ concurrently transmit data at timeslot $T_4$ and consult timeslot $T_G$, the D bit indicate that the data was not successfully decoded. The lack of success results from the collision that occurred when both remote units transmitted concurrently.

Figure 3:
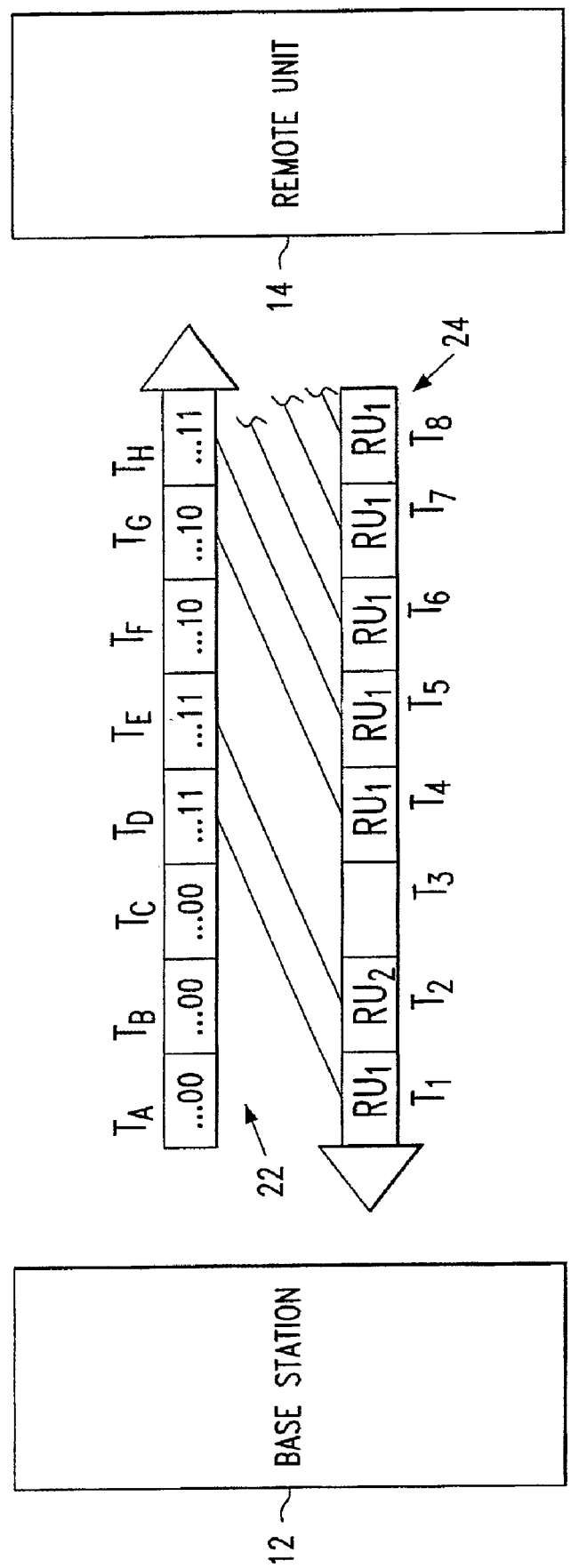
FIG. 3 illustrates a first remote unit and a second remote unit trying to access the reverse channel.

FIG. 3 illustrates a remote unit transmitting a first portion of data at timeslot $T_1$. The first portion of data can be data that can fit within a single timeslot. The first portion of data at least identifies the remote unit that transmitted the first portion of data. The first portion of data can include any additional data that fits within the timeslot with the identification information. After transmission of the first portion of data, the remote unit performs an access check method to determine whether the remote unit has successfully accessed the reverse channel 24. If the access check method indicates that the remote unit has accessed the reverse channel 24, the remote unit transmits a second portion of the data. However, if the access check method indicates that the remote unit has not accessed the reverse channel 24, the remote unit performs an access failure method.

The access check method can include a determination of whether the first portion of data has been successfully decoded by checking the D bit in the round-trip timeslot as described above. When the first portion of data is not successfully decoded, the remote unit executes an access failure method.

The access check method can also include determining whether the reverse channel 24 remains available from the transmission timeslot up to the round-trip timeslot. If the reverse channel 24 becomes unavailable during any of these timeslots 26, the remote unit executes an access failure method. The access failure method is performed because the reverse channel 24 has been acquired by another remote unit.

FIG. 3 illustrates the forward 22 and reverse 24 channels when more than one remote unit tries to access the reverse channel 24. A second remote unit $RU_2$ transmits a first portion of data at timeslot $T_2$ in an attempt to access the reverse channel 24. The second remote unit $RU_2$ then consults timeslots $T_B$, $T_C$ and $T_D$ to determine whether the channel became unavailable during any of these timeslots 26. Timeslot $T_D$ indicates that the remote unit became unavailable as a result of a first remote unit $RU_1$ transmitting a first portion of data at timeslot $T_1$. Because the first remote unit $RU_1$ tried to access the reverse channel 24 before the second remote unit $RU_2$, the second remote unit $RU_2$ defers to the first remote unit by executing an access failure method. In contrast, the first remote unit consults timeslots 26 $T_A$, $T_B$ and $T_C$ to determine whether the reverse channel 24 has become unavailable. Since the reverse channel 24 remained available and because the round-trip timeslot, $T_D$, indicates that the base station successfully decoded the first portion of data, the first remote unit transmits a second portion of data starting a timeslot $T_4$.

When the entire amount of data to be transmitted from a remote unit is transmitted in a single timeslot, the base station need not indicate that the reverse channel 24 is unavailable. The base station can determine when a single timeslot includes all the data by consulting the header of the transmission where the length of the data is listed. When the data in the timeslot matches the length listed in the header, the base station changes the D bit but does not change the B/I bit. That combination of the B/I bit and the D bit at the round-trip timeslot indicates to the remote unit that the data was properly decoded. However, because the B/I bit indicates that the reverse channel 24 is still available, the transmission will not prevent another remote unit from trying to access the reverse channel 24. For instance, if the first remote unit $RU_1$ in FIG. 3 transmitted data which fit within a single timeslot at timeslot $T_1$, the timeslot $T_D$ would show a B/I bit of zero. As a result, the second remote unit $RU_2$ would transmit the first portion of data at timeslot $T_5$.

The access failure method can include waiting a second random time. After waiting the second random time, the remote unit makes a determination whether the reverse channel 24 is available by consulting the B/I bit. When the reverse channel 24 is available, the remote unit transmits the first portion of data. When the reverse channel 24 is unavailable, the remote unit waits until it becomes available and waits the first random time. After waiting the first random time, the remote unit determines whether the reverse channel 24 is available by consulting the B/I bit. When the reverse channel 24 is unavailable, the remote unit re-executes the access failure method; and when the reverse channel 24 is available, the remote unit transmits the first portion of data and proceeds as described above.

The first random time can be a random time between a first minimum value and a first maximum value. The first minimum value and the first maximum value can be constants or can be variables. The first minimum value can be as low as zero timeslots 26 and the first maximum value can be equal to or greater than the first minimum value. The first minimum value and first maximum value can be administratively entered into the remote units. Alternatively, they can be transmitted from the base station to each of the remote units. Each remote unit can have the same first minimum and the same first maximum value. Alternatively, all or a portion of the remote units can have a different first minimum value and a different first maximum value.

The second random time can be a random value between a second minimum value and a second maximum value. The second minimum value and the second maximum value can be constants or variables. The second minimum value can be as low as zero timeslots 26 and the second maximum value can be equal to or greater than the second minimum value. The second minimum value can be the same as the first minimum value and/or the second maximum value can be the same as the first maximum value. The second minimum value and second maximum value can be administratively entered into the remote units. Alternatively, they can be transmitted from the base station to each of the remote units. Each remote unit can have the same second minimum and the same second maximum value. Alternatively, all or a portion of the remote units can have a different second minimum and different second maximum values.

The first minimum value, the first maximum value, the second minimum value and the second maximum value can each be a function of system conditions. For instance, the first minimum value, the first maximum value, the second minimum value and the second maximum value can be a function of the number of remote units being served by a base station. In one embodiment, the first maximum value and/or the second maximum value increases as the number of remote units being served increases and decreases as the number of remote units being served decreases. Accordingly, the random delays can have longer durations to account for the larger number of remote units that may be trying to access the channel.

In a preferred embodiment, the second maximum value is a function of the number of times that the access failure method has been accessed before the first portion of data is transmitted. In one embodiment, the second maximum value increases for each additional time that the failure access method is accessed before the first portion of data is transmitted. In one embodiment, the second maximum value increases exponentially with the number of times that the access failure method is executed by the remote unit. For instance, the second random time can be between the second minimum value and the second maximum value+$c^n$, where n is the number of times that the access failure method is accessed and c is a constant which is preferably equal to 2. The first maximum value and $c^n$ each have units of timeslots so that the random time resulting from the relationship is measured in terms of the number of timeslots 26 that the remote unit waits.

Figure 4:
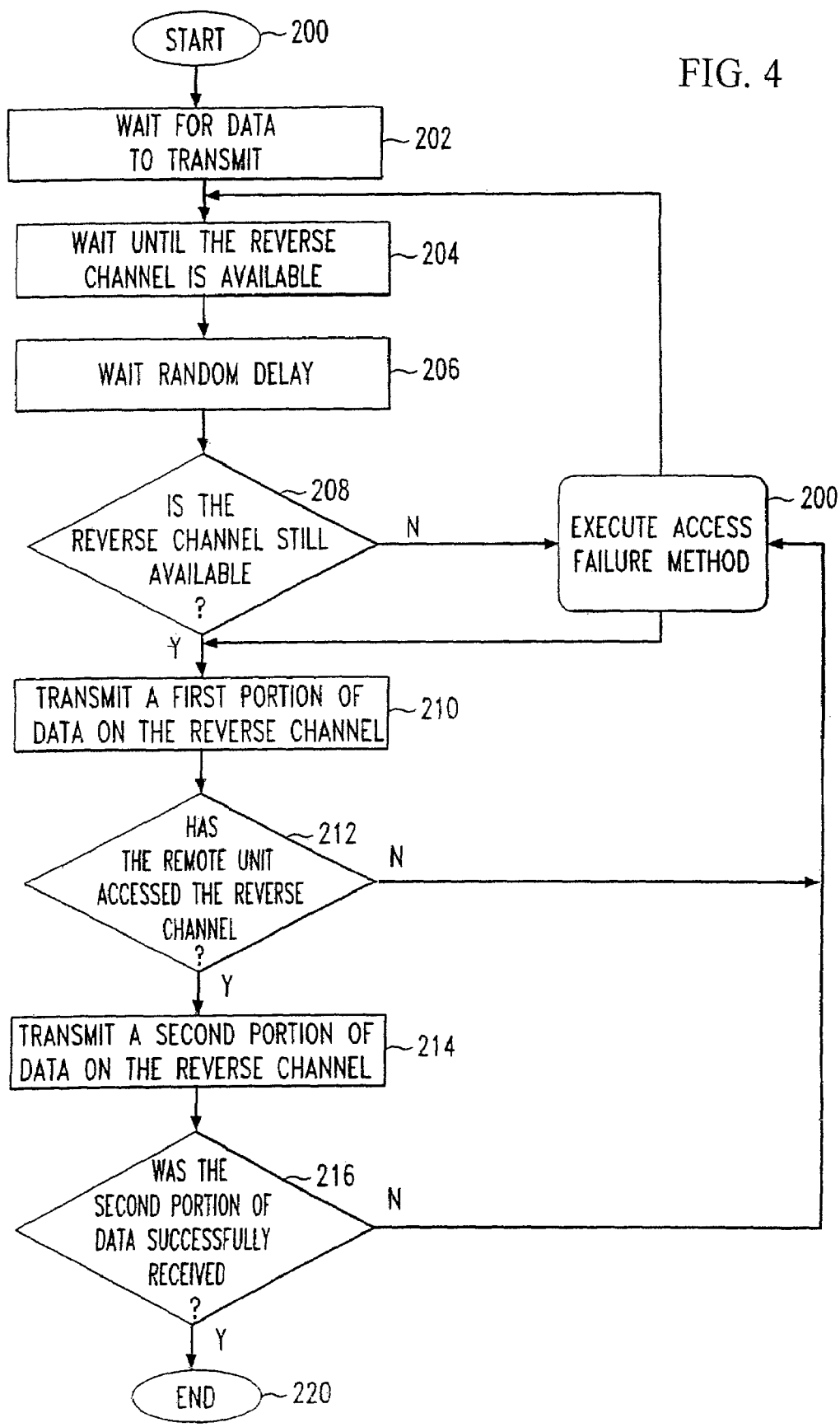
FIG. 4 illustrates an example of a channel access method.

FIG. 4 illustrates an embodiment of a channel access method. FIG. 4 also illustrates interaction between the channel access method, an access check method and an access failure method. The channel method begins at start block 200 when the remote unit has been turned on. At process block 202 the remote unit waits until it has data to be transmitted to the base station on a control channel. At process block 204 the remote unit waits until the reverse channel 24 is available. The remote unit determines when the reverse channel 24 is available by monitoring forward channel 22 until the B/I bit indicates that the reverse channel 24 is available. Once the reverse channel 24 is available, the remote unit waits the first random time at process block 206.

At determination block 208, the remote unit determines whether the reverse channel 24 is still available. This determination is made by consulting the B/I bit once the first random time has expired. When the determination is positive, the remote unit proceeds to process block 210 where it transmits a first portion of the data on the reverse channel 24.

Figure 5:
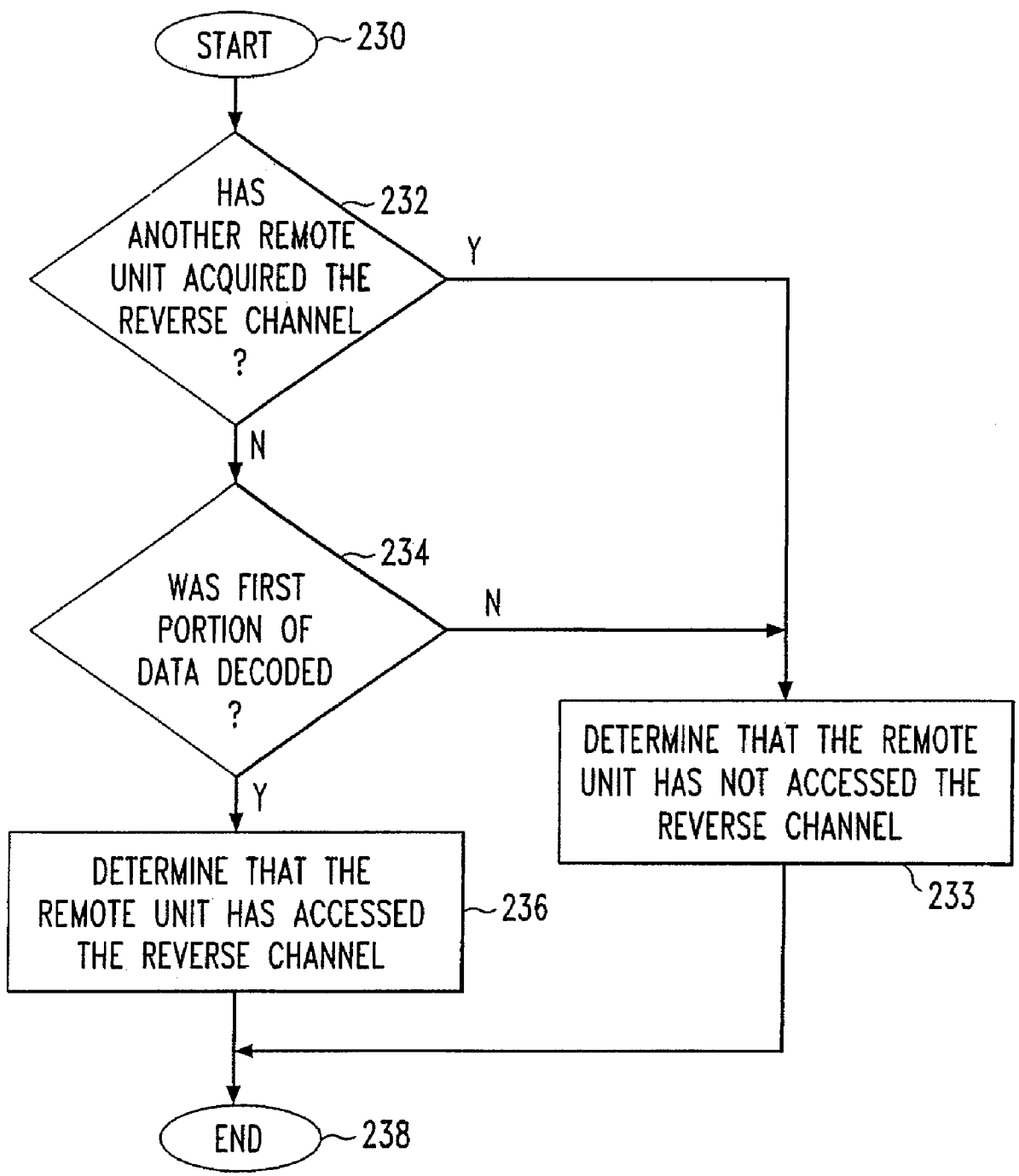
FIG. 5 illustrates an example of an access check method for determining whether a remote unit has accessed a reverse channel.

A determination is made whether the remote unit has accessed the reverse channel 24 at determination block 212. FIG. 5 provides an example of an access check method for determining whether a remote unit has accessed a reverse channel 24. When the determination at determination block 212 is positive, the remote unit proceeds to process block 214 where it transmits a second portion of the data on the reverse channel 24. At determination block 216, the remote unit determines whether the second portion of data was successfully decoded at the base station. This determination is made by monitoring the D bit in the round-trip timeslots 26 associated with each timeslot where the second portion of data is transmitted. As a result, the remote unit continues to monitor the D bit on the forward channel 22 after the remote unit has stopped transmitting data on the reverse channel 24. The determination is positive unless any of the D bits in the round-trip timeslot indicate that data was not successfully decoded. When the determination is positive, the method terminates at end block 220.

Figure 6:
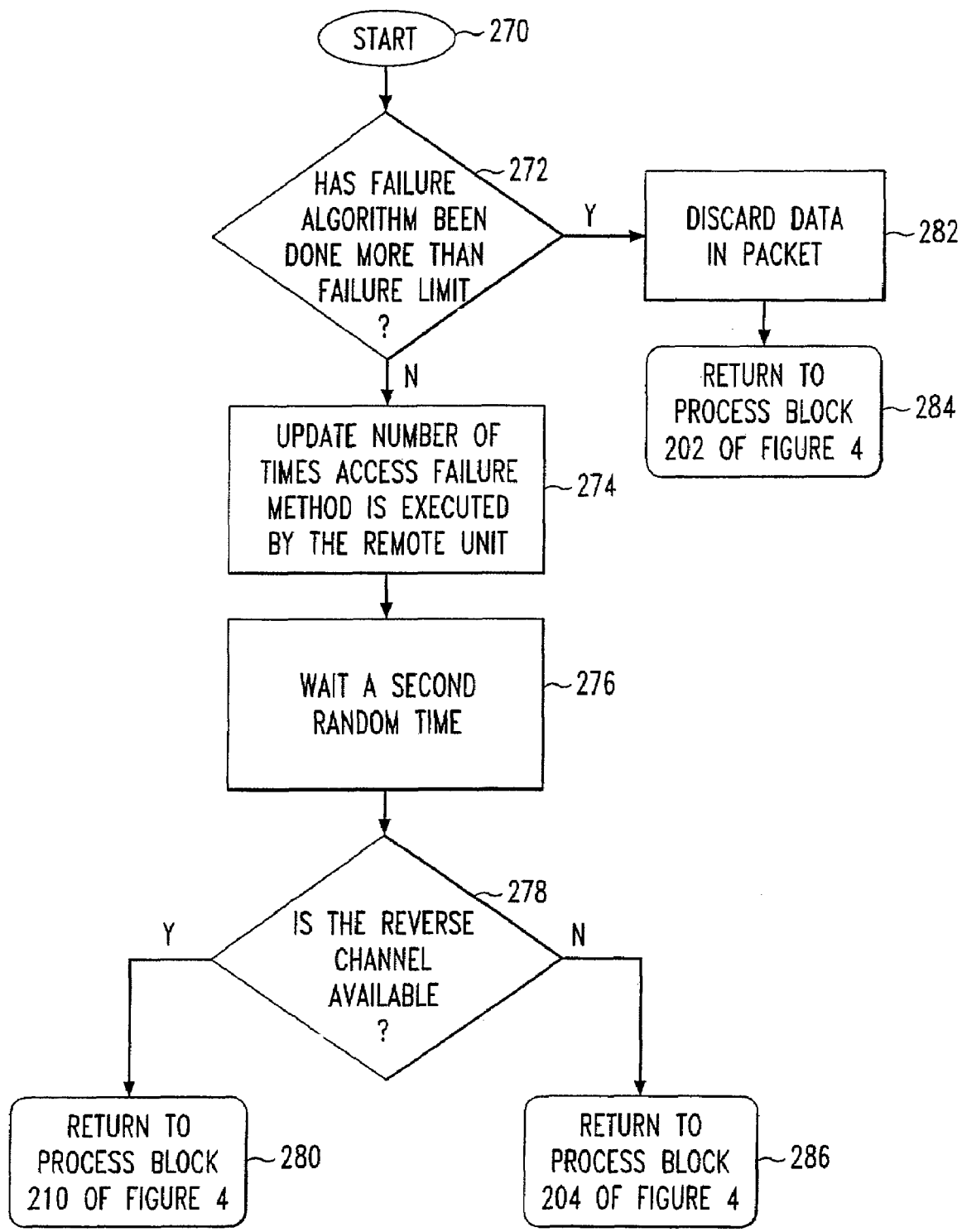
FIG. 6 illustrates an access failure method which is executed by the remote unit after the channel access method fails to provide the remote unit with access to the reverse channel.

When the determination at determination block 208, 212 or 216 is negative, the remote unit executes an access failure method at process block 218. FIG. 6 provides an example of an access failure method that is suitable for use with particular embodiments of the invention. As is evident from FIG. 4, the failure access method can return the method to one or more locations in the channel access method. For instance, the access failure method illustrated in FIG. 6 returns the method to process block 202 in some instances, process block 204 in other instances and process block 210 in still other instances.

FIG. 5 provides an example of an access check method for determining whether a remote unit has accessed a reverse channel 24. The method is initiated at start block 230. At determination block 232, a determination is made whether another remote unit has accessed the reverse channel 24. This determination is made by consulting the B/I bit from the timeslot where the first portion of data is transmitted up to but not including the round-trip timeslot associated with the timeslot where the first portion of data is transmitted. The determination at determination block 234 is negative unless the B/I bit in any of the consulted timeslots 26 indicate that the reverse channel 24 is unavailable. When the determination is positive, it is determined that a remote unit has not accessed the reverse channel at process block 233.

When the determination at determination block 232 is negative, the remote unit proceeds to determination block 234 where a determination is made whether the first portion of data transmitted from the remote unit was successfully decoded. This determination can be made by consulting the round-trip timeslot associated with the timeslot where the first portion of data was transmitted as described above. The determination is positive unless either the B/I bit and the D bit indicate that the data was not received, not decoded or both. When the determination is positive, it is determined that the remote unit has accessed the reverse channel 24 at process block 236. When the determination is negative, it is determined that the remote unit has not accessed the reverse channel 24 at process block 233.

FIG. 6 illustrates an access failure method. The access failure method is initiated at start block 270 when the method is accessed after a remote unit failed to access a channel. At determination block 272, a determination is made whether the access failure method has been accessed more than an access failure maximum threshold. When the determination is negative, the remote unit proceeds to process block 274 where the number of times that the failure access method is executed is updated. As described above, the number of times that the failure access method is accessed can be used to determine the second random time.

At determination block 276, the remote unit waits a second random time. As described above, the second random time can be a function of the number of times that the access failure method has been accessed. At determination block 278, the remote unit determines whether the reverse channel 24 is available. This determination is made by consulting the B/I bit once the second random time has expired. When the determination is negative, the method proceeds to return block 286 where the method is returned to process block 204 of FIG. 4. When the determination is positive, the method proceeds to return block 280 where the method is returned to process block 210 of FIG. 4.

When the determination at process block 272 is positive, the remote unit proceeds to process block 282 where the data packet is discarded. The method proceeds from process block 282 to return block 284. At return block 284, the method is returned to process block 202 of FIG. 4.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed:

1. A method for accessing a reverse channel for providing communication between a remote unit and a base station of a wireless network comprising a plurality of base stations in wireless communication with a plurality of remote units, comprising:

executing a channel access method to access the reverse channel, wherein the channel access method includes waiting a first random period of time in response to determining that the reverse channel is available;

waiting the first random period of time;

determining that the channel access method failed to provide access to the reverse channel after the first random period of time; and waiting a second random period of time before determining whether the reverse channel is available, wherein the second random period of time is between an upper and a lower limit, the upper limit being a function of a number of times that the channel access method fails to provide access to the reverse channel.

2. The method of claim 1, further comprising:
   transmitting from the remote unit to the base station a first portion of data in response to a determination that the reverse channel is available after passage of the second random period of time, the first portion of data being transmitted on the reverse channel.

3. The method of claim 2, further comprising:
determining whether transmission of the first portion of data has caused the remote unit to access the reverse channel.

4. The method of claim 1, further comprising:
determining whether the channel access method has failed to provide access to the reverse channel a number of times where the number of times exceeds a failure maximum threshold.

5. The method of claim 4, further comprising:
discarding data of a packet responsive to the determination that the number of times exceeds the failure maximum threshold.

6. The method of claim 1, further comprising:
re-executing the channel access method in response to a determination that the reverse channel is not available after passage of the second random period of time.

7. The method of claim 1, further comprising:
after accessing the reverse channel, transmitting a first packet of data;
performing an access check subroutine; and
if performance of the access check subroutine is favorable, then transmitting a second packet of data;
wherein performing the access check subroutine comprises at least:
determining whether another remote unit acquired the reverse channel, or determining whether the first packet of data was decoded.

8. The method of claim 1, further comprising:
after accessing the reverse channel, transmitting a first packet of data;
performing an access check subroutine; and
if performance of the access check subroutine is favorable, then transmitting a second packet of data.

9. A method for accessing a reverse channel for providing communication between a remote unit and a base station of a wireless network comprising a plurality of base stations in wireless communication with a plurality of remote units, comprising:
executing a channel access method to access the reverse channel; and
in the event of a failure to access the reverse channel after a first random delay time, reexecuting the channel access method in response to a determination that the reverse channel is not available after passage of the first random delay time, wherein the first random delay time is between an upper and a lower limit, the upper limit being a function of a number of times that the channel access method fails to provide access to the reverse channel.

10. The method of claim 9, further comprising:
transmitting from the remote unit to the base station a first portion of data in response to a determination that the reverse channel is available after passage of a second random delay time, the first portion of data being transmitted on the reverse channel.

11. The method of claim 10, further comprising:
determining whether transmission of the first portion of data has caused the remote unit to access the reverse channel.

12. The method of claim 9, further comprising:
determining whether the channel access method has failed to provide access to the reverse channel a threshold number of times where the threshold number of times exceeds a failure maximum threshold.

13. The method of claim 12, further comprising:
discarding data of a packet responsive to the determination that the threshold number of times exceeds the failure maximum threshold.

14. Telecommunications remote unit apparatus for accessing a reverse channel for providing communication between a remote unit and a base station of a wireless network comprising a plurality of base stations in wireless communication with a plurality of remote units, comprising:
means for executing a channel access method to access the reverse channel, wherein the channel access method includes waiting a first random period of time in response to determining that the reverse channel is available;
means for waiting the first random period of time;
means for determining that the channel access method failed to provide access to the reverse channel after the first random period of time; and
means for waiting a second random period of time before determining whether the reverse channel is available, wherein the second random period of time is between an upper and a lower limit, the upper limit being a function of a number of times that the channel access method fails to provide access to the reverse channel.

* * * * *